United States Patent
Filippi

(10) Patent No.: US 9,039,795 B2
(45) Date of Patent: May 26, 2015

(54) REFORMING PROCESS FOR SYNTHESIS GAS PRODUCTION AND RELATED PLANT

(75) Inventor: Ermanno Filippi, Castagnola (CH)

(73) Assignee: Casale SA (CH)

( * ) Notice: Subject to any disclaimer, the term of this patent is extended or adjusted under 35 U.S.C. 154(b) by 610 days.

(21) Appl. No.: 11/817,299

(22) PCT Filed: Feb. 20, 2006

(86) PCT No.: PCT/EP2006/001500
§ 371 (c)(1),
(2), (4) Date: Feb. 28, 2008

(87) PCT Pub. No.: WO2006/094618
PCT Pub. Date: Sep. 14, 2006

(65) Prior Publication Data
US 2008/0263957 A1    Oct. 30, 2008

(30) Foreign Application Priority Data
Mar. 4, 2005    (EP) .................................... 05004846

(51) Int. Cl.
*C01B 3/36* (2006.01)
*C01B 3/38* (2006.01)
*B01J 8/04* (2006.01)
*B01J 8/06* (2006.01)

(52) U.S. Cl.
CPC ............. *C01B 3/382* (2013.01); *B01J 8/0496* (2013.01); *B01J 8/067* (2013.01); *C01B 3/384* (2013.01); *B01J 2208/00212* (2013.01); *B01J 2208/00256* (2013.01); *B01J 2208/00274* (2013.01); *B01J 2208/0053* (2013.01); *B01J 2219/00006* (2013.01); *C01B 2203/0233* (2013.01); *C01B 2203/0244* (2013.01); *C01B 2203/0261* (2013.01); *C01B 2203/0805* (2013.01); *C01B 2203/142* (2013.01); *C01B 2203/148* (2013.01)

(58) Field of Classification Search
CPC ............ C01B 2203/0244; C01B 3/382; C01B 2203/142; C01B 2203/82
USPC .......................... 48/61–118.5, 127.1, 127.9, 48/197 R–197 A; 422/129–242; 429/400–535
See application file for complete search history.

(56) References Cited

U.S. PATENT DOCUMENTS

| | | | |
|---|---|---|---|
| 3,264,066 A | | 8/1966 | Quartulli et al. |
| 3,278,452 A | * | 10/1966 | Vorum ........................ 252/376 |
| 3,771,261 A | * | 11/1973 | Mandelik et al. ........... 48/214 A |
| 6,077,459 A | | 6/2000 | Laursen et al. |
| 2004/0058230 A1 | * | 3/2004 | Hsu ................................ 429/62 |
| 2005/0171217 A1 | | 8/2005 | Bowe et al. |
| 2005/0172553 A1 | * | 8/2005 | Zartenar et al. .............. 48/127.9 |

FOREIGN PATENT DOCUMENTS

WO    WO 03/016250    2/2003

* cited by examiner

*Primary Examiner* — Imran Akram
(74) *Attorney, Agent, or Firm* — Akerman LLP

(57) ABSTRACT

A reforming process for synthesis gas (12) production from a mixture of hydrocarbons (14) comprises a first step, or pre-reforming step, in which a process mixture 18), comprising said mixture of hydrocarbons :14: and steam (16), is subjected to a preliminary catalytic conversion reaction, obtaining a partial conversion product (22) comprising hydrogen, carbon oxides and hydrocarbons, and a second step, or main reforming step, in which said partial conversion product (22) is subjected to a conversion completion reaction, obtaining said synthesis gas (12), said pre-reforming step being carried out in pseudo-isothermal conditions.

6 Claims, 1 Drawing Sheet

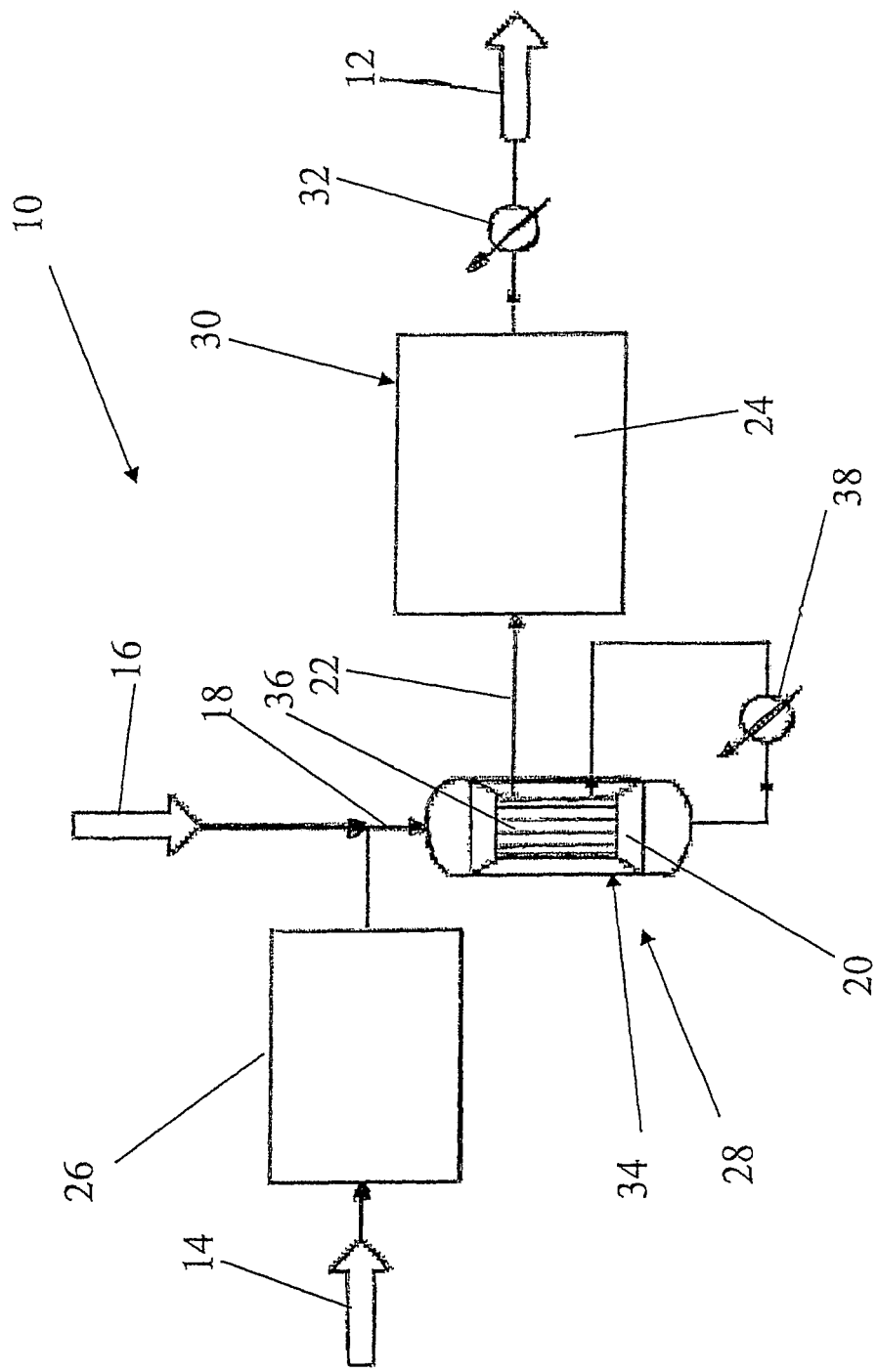

REFORMING PROCESS FOR SYNTHESIS GAS PRODUCTION AND RELATED PLANT

FIELD OF APPLICATION

The present invention refers, in its most general aspect, to the production of synthesis gas, i.e. a mixture comprising hydrogen and carbon oxides that is the basis of different productions, including fertilizers, methanol and its derivatives, and various compounds of organic chemistry.

In particular, the invention refers to a reforming process for synthesis gas production from a mixture of hydrocarbons of the type comprising a first step, or pre-reforming step, in which a process mixture, comprising said mixture of hydrocarbons and steam, is subjected to a preliminary catalytic conversion reaction, obtaining a partial conversion product comprising hydrogen, carbon oxides and hydrocarbons, and a second step, or main reforming step, in which said partial conversion product is subjected to a conversion completion reaction, obtaining said synthesis gas.

PRIOR ART

It is known that, on an industrial scale, synthesis gas is obtained:
- through a catalytic conversion reaction of hydrocarbons in the presence of steam, typically carried out in a steam reforming apparatus (so-called steam reformer), or
- through a partial oxidation reaction of hydrocarbons in a non-catalytic partial oxidation reforming apparatus (so-called partial oxidator), or
- through a partial oxidation reaction of hydrocarbons in a catalytic, partial oxidation reforming apparatus (so-called autothermal, reformer).

In the present application, by "main reforming" it is understood any one of the aforementioned three processes, or a combination thereof.

There is also a well known requirement to obtain a synthesis gas rich in hydrogen, for example with a hydrogen content of between 40% and 50% (dry basis), without having to make a reforming apparatus, of any one of the three types mentioned above, that is particularly complex, both in terms of investment costs and in terms of management and maintenance costs.

For such a purpose, the prior art makes use of a reforming process for synthesis gas production, from a gaseous mixture of hydrocarbons, in which a pre-reforming step is provided that precedes the main reforming step, so that the reforming apparatus can operate on a gaseous mixture in which the hydrocarbons have already been partially converted into synthesis gas. The pre-reforming step takes place in a suitable chemical reactor, also known as pre-reformer, that is less complex than the reforming apparatus, through a catalytic conversion reaction of hydrocarbons in the presence of steam.

It takes the form of an adiabatic type reactor, which is generally equipped with a single catalytic bed. Upstream of the reactor, a heat recovery section can also be provided to recover heat from the gaseous process mixture, comprising said gaseous mixture of hydrocarbons and steam, which is reacted.

Although advantageous for different points of view, a reforming process for synthesis gas production according to what has been schematically described has recognized drawbacks the main one of which is that the partial conversion product obtained in the pre-reforming step has a very limited degree of conversion of the hydrocarbons into synthesis gas, for example a conversion into synthesis gas of a percentage value between 5% and 25% of the initial gaseous mixture of hydrocarbons is obtained, thus cooperating with the subsequent main reforming step in a not entirely satisfactory way.

SUMMARY OF THE INVENTION

The technical problem underlying the present invention is that of devising and providing a reforming process for synthesis gas production of the type considered, capable of satisfying the requirement stated above and simultaneously able to allow a degree of conversion of the hydrocarbons into synthesis gas in the pre-reforming step that is better than the prior art to be obtained, in a simple and cost-effective way.

This problem is solved, according to the present invention, by a reforming process for synthesis gas production, from a mixture of hydrocarbons, of the aforementioned type and characterized in that said pre-reforming step is carried out in pseudo-isothermal conditions.

In this way, by keeping the temperature of the catalyst used in the pre-reforming step substantially constant, it is possible to obtain, in output from the pre-reforming step, a partial conversion product in which, for example, a percentage between 15% and 40% of hydrocarbons has been converted into synthesis gas.

Further characteristics and advantages of the reforming process for synthesis gas production according to the present invention shall become clear from the following description of a preferred embodiment thereof, made for indicating and not limiting purposes, with reference to the attached drawings.

BRIEF DESCRIPTION OF THE DRAWINGS

FIG. 1 schematically represents a reforming plant for synthesis gas production that carries out a reforming process according to the present invention.

DETAILED DESCRIPTION OF A PREFERRED EMBODIMENT

With reference to FIG. 1, a reforming plant for synthesis gas production is shown, globally indicated with 10, which carries out a process for synthesis gas 12 production in accordance with the present invention.

The aforementioned reforming process for synthesis gas production is carried out from a mixture of hydrocarbons 14. The mixture of hydrocarbons 14 is preferably gaseous and therefore hereafter in the description reference shall be made to a mixture of this type.

Steam 16 is introduced into the gaseous mixture of hydrocarbons 14, obtaining a gaseous process mixture 18 comprising hydrocarbons and steam. Preferably, the gaseous mixture of hydrocarbons 14 is heated, before the steam 16 is introduced into it.

The process comprises a first step, or pre-reforming step, in which said gaseous process mixture 18 is subjected to a preliminary catalytic conversion reaction, obtaining a partial conversion product 22 comprising hydrogen, carbon oxides and hydrocarbons.

Said pre-reforming step is followed by a second step, or main reforming step, in which said partial conversion product 22 is subjected to a conversion completion reaction, obtaining said synthesis gas 12.

In accordance with an aspect of the present invention, said pre-reforming step is carried out in pseudo-isothermal conditions. Preferably, said pre-reforming step takes place at a temperature of between 400° C. and 650° C. In this way, it has been found that, in the partial conversion product 22, for example a percentage greater than 30% of hydrocarbons has been converted into synthesis gas.

Since the preliminary catalytic conversion reaction that is carried out in the pre-reforming step is endothermic, it is necessary to supply heat into the catalytic bed.

The reforming plant 10 comprises, in mutual fluid communication and in succession with each other, a possible pre-heating section 26, a pre-reforming section 28, which comprises a first reaction area 20 in which said pre-reforming step is carried out, and a main reforming section 30, which comprises a second reaction area 24 in which said main reforming step is carried out.

The pre-heating section 26 is also equipped with a purification portion, i.e. a desulphurization portion, of the gaseous mixture of hydrocarbons 14.

The main reforming section 30 can consist of a steam reformer, a partial oxidator or an autothermal reformer, or a combination thereof.

In accordance with an aspect of the present invention, the first reaction area 20 of the pre-reforming section 28 is in the form of a catalytic bed of a pseudo-isothermal reactor 34, in said catalytic bed a heat exchange unit 36 being supported, where an operating heat exchange fluid flows, said heat exchange unit 36 giving up heat to the catalytic bed. Alternatively, many heat exchange units can be provided.

Preferably, the heat exchange unit 36 comprises per se known plate type heat exchangers: they have substantially flattened box-shaped bodies, with substantially parallelepiped, rectangular configuration, defining respective inner chambers crossed by said operating heat exchange fluid.

In a preferred embodiment of the invention, the gases in output from the pseudo-isothermal reactor 34 are in part sent to a heat recovery unit 38 to be heated: such gases are then introduced into the heat exchange unit 36 (in the case of use of plate type heat exchangers, such gases are introduced into the inner chambers of the exchangers themselves), and thus constitute said operating heat exchange fluid.

Advantageously, the heat necessary for the heat recovery unit 38 can be taken away from the hot smokes generated in the main reforming section 30 or a purpose-built oven can be provided for this.

The operation of the reforming plant 10 according to the invention is specified hereafter.

The gaseous mixture of hydrocarbons 14, used as a raw material for the generation of the synthesis gas, is introduced into the pre-heating section 26, where it is heated, for example up to 550° C., and desulphurized.

Downstream of the pre-heating section 26, steam 16 is introduced into, the gaseous mixture of hydrocarbons 14, obtaining the gaseous process mixture 18 comprising hydrocarbons and steam that is fed to the pre-reforming section 28.

According to a preferred embodiment of the invention, not represented, the steam 16 is also heated in the pre-heating section 26. Regarding this, it is for example provided to introduce steam 16 into the gaseous mixture of hydrocarbons 14 upstream of the pre-heating section 26.

The gaseous process mixture 18 crosses the catalytic bed of the pseudo-isothermal reactor 34 and reacts partially converting the hydrocarbons into hydrogen and carbon oxides. The heat exchange unit 36 gives up the heat necessary for such a partial conversion to the catalytic bed of the pseudo-isothermal reactor 34.

The partial conversion product 22, comprising hydrogen, carbon oxides and hydrocarbons, obtained in the pre-reforming section 28, is then sent to the main reforming section 30, where there is a complete conversion of the hydrocarbons obtaining the desired synthesis gas 12.

Downstream of the main reforming section 30, a heat recovery section 32 is provided, which is generally in the form of a boiler, where the synthesis gas 12 produced is cooled to recover heat.

In a further embodiment of the reforming plant according to the invention, upstream of the main reforming section 30, a further pre-heating section (not illustrated in the FIGURE) is provided to heat the partial conversion product 22 up to, an optimal temperature, for example 680° C., for the reforming reaction that is carried out in the main reforming section 30. Advantageously, the heat necessary for the further pre-heating section can be taken away from the hot smokes generated in the main reforming section 30 or a purpose-built oven can be provided for this.

From the previous description it can clearly be seen that the reforming process for synthesis gas production according to the invention solves the technical problem and achieves numerous advantages the first of which lies in the fact that an unusually high degree of conversion for the pre-reforming section is allowed, thanks to the possibility of precisely controlling the thermal profile of the catalytic bed of the pseudo-isothermal reactor, this being made possible by the presence of the heat exchange unit in the catalytic bed itself and in particular by the fact that the heat exchange elements (for example the plate type heat exchangers) used are in a relationship of direct heat exchange with the catalyst contained in the catalytic bed.

Another advantage of the present invention is the possibility of optimizing the design of the main reforming section, minimizing the load upon it, which is generally much more complex and expensive than the pre-reforming section. In the case of use of an autothermal reformer or a partial oxidator, the requirement for pure oxygen and the consequent size of the air separation unit suitable for obtaining such pure oxygen is minimized.

Another advantage of the invention is that, in the case of already existing reforming plants, it is possible to increase the production capacity through the insertion of a new pre-reforming section with a pseudo-isothermal reactor, or through the modification of the already existing pre-reforming section according to the present invention.

A further advantage of the invention is, in the case of a main reforming section with an autothermal reformer, that of obtaining a synthesis gas, for example for the methanol synthesis, with a more favorable stechiometric ratio for said synthesis and at the same time reducing the oxygen consumption of the autothermal reformer.

Of course, a man skilled in the art can bring numerous modifications to the reforming process for synthesis gas production described above, in order to satisfy specific and contingent requirements, all of which are covered by the scope of protection of the present invention, as defined by the following claims.

The invention claimed is:

1. A reforming process for synthesis gas production from a mixture of hydrocarbons comprising the steps of:
    a pre-reforming step, in which a process mixture, comprising said mixture of hydrocarbons and steam, is subjected to a preliminary catalytic conversion reaction, obtaining a partial conversion product comprising hydrogen, carbon oxides and hydrocarbons, said pre-reforming step carried out in pseudo-isothermal conditions controlling the thermal profile of the pre-reforming step by keeping the temperature of the catalyst used in the pre-reforming step substantially constant through indirect heat exchange, and a main reforming step, in which said partial conversion product is subjected to a conversion completion reaction, obtaining said synthesis gas, wherein no oxygen is fed to the pre-reforming step, and wherein at least one part of said partial conversion product obtained in said pre-reforming step is subjected to heating and then used as operating heat exchange fluid for supplying heat through the indirect heat exchange in said pre-reforming step.

2. The reforming process according to claim 1, wherein said pre-reforming step takes place at a temperature of between 400° C. and 650° C.

3. The reforming process according to claim 1, wherein the heat necessary for said heating of said at least one part of the partial conversion product is taken away from hot effluent generated in said main reforming step.

4. The reforming process according to claim 1, wherein said mixture of hydrocarbons is subjected to pre-heating.

5. The reforming process according to claim 1, wherein said partial conversion product obtained in said pre-reforming step is subjected to heating before it is introduced into said main reforming step.

6. The reforming process according to claim 5, wherein the heat necessary for said heating of said partial conversion product is taken away from hot effluent generated in said main reforming step.

* * * * *